UNITED STATES PATENT OFFICE.

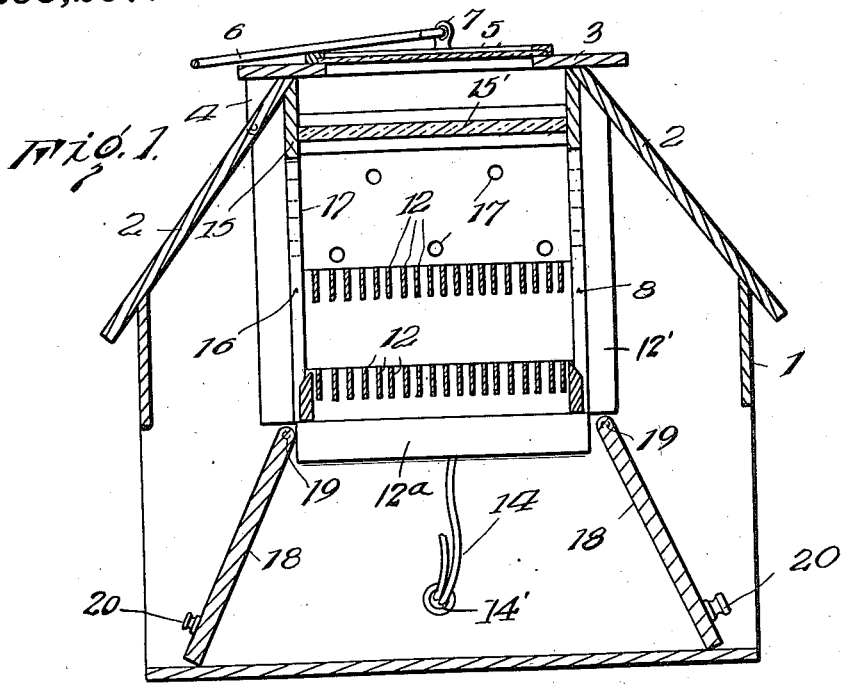
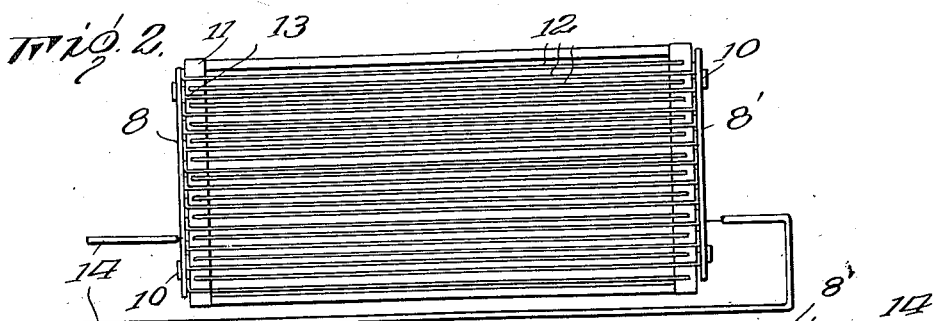
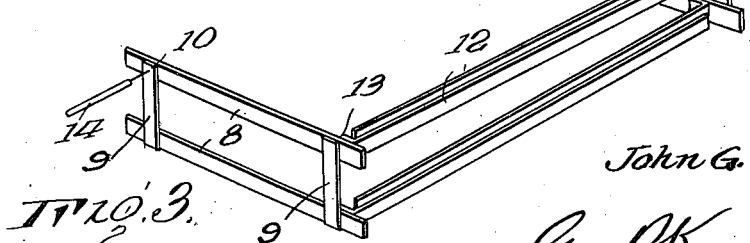

JOHN G. REED, OF PASADENA, CALIFORNIA, ASSIGNOR, BY MESNE ASSIGNMENTS, OF ONE-THIRD TO JOHN L. ROBBINS, OF OXNARD, CALIFORNIA.

INSECT-TRAP.

1,295,207.	Specification of Letters Patent.	Patented Feb. 25, 1919.

Application filed March 9, 1917. Serial No. 153,711.

*To all whom it may concern:*

Be it known that I, JOHN G. REED, a citizen of the United States, and resident of Pasadena, in the county of Los Angeles and State of California, have invented certain new and useful Improvements in Insect-Traps, of which the following is a specification.

The present invention relates to insect traps and has more especial reference to an improved electrical insect trap.

The dominant object of the invention is to provide an electrical insect trap for exterminating flies and other disagreeable insects, whereby, when the insect engages certain of the portions of the trap, it will be instantly electrocuted.

Another object of the invention is to provide means for receiving the dead insects from the electrocuting means, the said means being so arranged as to prevent the exposing of the dead insects therein, and to permit the same to be readily removed when cleaning the trap.

It is also an object of the invention to provide a novel removable electrocuting means, so arranged as to complete an electric circuit through the body of the insect when the same is engaged therewith, the electric current being of a voltage sufficient to instantly kill the insect.

Among other aims and objects of the invention may be recited, the provision of a trap of the character mentioned with a view to compactness, and in which the number of parts are few, the construction simple, the cost of production small, and efficiency and operation high.

In order that the invention and the manner of its application may be readily understood by those skilled in the art, I have in the accompanying illustrative drawings and in the detailed following description based thereon set forth the preferred embodiment of the invention.

In the drawings:

Figure 1 is a vertical transverse section through my improved insect trap;

Fig. 2 is a detail in top plan of the electrocuting means; and

Fig. 3 is a fragmentary detail in perspective showing the active elements and their arrangements.

Referring now more specifically to the several figures of the said drawings and in connection with which like reference numerals refer to the same parts, there is provided a housing, indicated in its entirety by the numeral 1, the said housing comprising side and end walls, the said side walls being opened at their lower extremities and a plurality of diagonally disposed cover plates 2, which cover plates are so arranged as to provide a longitudinally disposed opening within the top of the housing, the opening in turn being normally closed by means of a cover plate 3, the same being pivotally secured to one of the diagonal cover plates 2 as at 4. The cover plate 3 is provided with a substantially rectangular shaped opening to disclose the interior of the housing 1, the opening being normally closed by means of a transparent pane 5, which is arranged thereover and secured to the closure plate 2 in any suitable manner. A bail 6 having the ends thereof pivotally engaged with eyelets 7 embedded in the said closure plate 3 is provided and obviously affords means whereby the trap may be readily moved from place to place.

Suitable means, not shown, may of course be provided for normally maintaining the hinged closure plate 3 in closed position over the open upper portion of the housing 1.

With a view toward providing efficient electrocuting means, I employ a plurality of grating like structures, indicated by the numeral 8, which grating structures comprise a plurality of superposed longitudinally extending bus bars 8', the said bars being secured in rigid spaced apart relation by means of vertically disposed strips 9 having their opposite ends secured to the said bus bars as at 10. Longitudinally disposed insulating strips 11 are arranged parallel to the sides of the bars 8' and are secured in position adjacent the same by means of a plurality of transversely disposed bars which are arranged between the opposite extremities thereof. Within the said insulating bars 11, a plurality of seats are formed and serve as means for seating the free end of certain of the active elements, which elements will be subsequently described. A plurality of transversely disposed metal bars 12, having certain of their ends offset as at 13 are alternately secured to the oppositely arranged superposed pairs of bus bars 8', the off-set portions 13 of the said metal bars being soldered or otherwise secured to their respective bus bars 8', while their remaining extremities are arranged in spaced relation from the adjacent bus bars. These transversely disposed metal bars 12, as will be appreciated, constitute the active elements of my improved electrocuting means and when supplied with the electrical energy through the medium of the bus bars 8', which in turn are energized by suitable electrical conductors 14 passing into the housing through an opening 14' formed in one end wall thereof, will instantly electrocute such insects as may engage those of the active elements which are connected to the positive and negative poles of the source of electrical energy.

A casing member 15 having portions of the sides thereof cut away as at 16 and a transparent closure 15' positioned near the top of the same, as arranged about the electrocuting means 8, the said open portion 16 in the side walls thereof permitting the entrance of flies or other insects to the cross bars or active elements 12. The closure 15' also serves as a guard for the active elements of the electrocuting structure. A plurality of openings 17 are formed within portions of the side walls and the end walls of the casing 15, and obviously, permits the odor of the bait used to enter the various compartments of the trap.

Brackets are formed upon the inner faces of the end walls of the housing 1 by arranging vertically disposed spaced strips 12' thereon and arranging horizontally disposed strips 12* thereon adjacent the lower ends of the strips 12', each of the strips being secured to their respective end walls of the housing by suitable fastening means. Thus, the casing member 15 as supporting the electrocuting means 8 may be removably arranged within the housing 1.

A plurality of doors 18 are pivotally secured to the end walls of the housing by means of a pivot rod 19 extending therethrough and are of a width to cause the same to assume inclined positions when closed as shown in the Fig. 1. Suitable knobs 20 may be and preferably are arranged upon the lower or free portions of the doors 18 for an obvious purpose. By so arranging the doors 18 within the housing 1, it is to be understood that the same not only serve as means for directing insects upwardly through the openings in the side walls of the housing into engagement with the electrocuting means, but also serve as means for closing the lower parts of the said housing, which parts receive thereinto the said insects from the electrocuting means, the electrocuting means as will be noted, being arranged above the bottom of the housing. Thus, means are provided for whereby the dead insects will be concealed from view and when it is desired to remove the same from the housing, either of the doors 18 may be swung to open position and the housing then tilted to cause discharging of the same therefrom.

A suitable opening 14' is formed within one of the end walls of the housing 1 and receives therethrough the electric conductors 14 which extend upwardly into engagement with certain of the bus bars 8'.

Obviously, the construction shown is capable of considerable modification and such modification as is within the scope of my claims, I consider within the spirit of my invention.

I claim:—

1. An insect trap including a housing having an open top, a transparent closure for said top, a frame supported in the upper portion of said housing adjacent the open top and spaced from the sides of the housing, the lower portions of said sides being open, doors pivoted to the opposite ends of the housing and engageable with its bottom for forming an insect receiving chamber therein, those portions of said ends adjacent the frame being perforated, superposed pairs of bus bars carried by said frame, and a plurality of sets of superposed contact bars alternately engaged with said bus bars and arranged in the frame.

2. An insect trap including a housing having an open top, a transparent closure for said top, a frame supported in the upper portion of said housing adjacent the open top and spaced from the sides of the housing, the lower portions of said sides being open, doors extending longitudinally of the housing and pivoted to the opposite ends thereof engageable with its bottom for affording an insect receiving chamber therein, and superposed electrocuting means arranged in the frame.

In testimony whereof I affix my signature hereto.

JOHN G. REED.